United States Patent
McDaniel et al.

(10) Patent No.: US 12,095,315 B2
(45) Date of Patent: Sep. 17, 2024

(54) POWER ELECTRONICS SECTION OF A STARTER-GENERATOR WITHOUT A COMMUTATOR

(71) Applicant: SAFRAN ELECTRICAL & POWER, Blagnac (FR)

(72) Inventors: Steven McDaniel, Burton, OH (US); Rémi Goncalves, Boissy-Saint-Léger (FR); Sachin Aggarwal, Silver Lake, OH (US); Eric Kline, Mogadore, OH (US); Rachid Boudyaf, San Diego, CA (US); Stefan Markus Teufel, Liberty, NC (US)

(73) Assignee: SAFRAN ELECTRICAL & POWER, Blagnac (FR)

( * ) Notice: Subject to any disclaimer, the term of this patent is extended or adjusted under 35 U.S.C. 154(b) by 279 days.

(21) Appl. No.: 17/770,805

(22) PCT Filed: Nov. 18, 2020

(86) PCT No.: PCT/US2020/060999
§ 371 (c)(1),
(2) Date: Apr. 21, 2022

(87) PCT Pub. No.: WO2021/101957
PCT Pub. Date: May 27, 2021

(65) Prior Publication Data
US 2022/0407395 A1     Dec. 22, 2022

Related U.S. Application Data

(60) Provisional application No. 62/937,946, filed on Nov. 20, 2019.

(51) Int. Cl.
*H02K 11/33*    (2016.01)
*H02K 5/04*     (2006.01)
(Continued)

(52) U.S. Cl.
CPC ............ *H02K 11/33* (2016.01); *H02K 5/04* (2013.01); *H02K 9/10* (2013.01); *H02K 9/22* (2013.01); *H02K 7/003* (2013.01)

(58) Field of Classification Search
CPC ........ H02K 11/33; H02K 11/30; H02K 7/003; H02K 9/00; H02K 9/02; H02K 9/04;
(Continued)

(56) References Cited

U.S. PATENT DOCUMENTS 8,957,557 B2 *   2/2015   Yamasaki   ............. H02K 9/227
                                                    310/72
10,263,495 B2 *  4/2019   Tahara     ................. H02K 11/33
(Continued)

FOREIGN PATENT DOCUMENTS

DE       10140328 A1    4/2003
DE    102012217698 A1   4/2014
(Continued)

OTHER PUBLICATIONS

International Search Report, PCT/US2020/060999 dated Feb. 18, 2021, 3 pages.

*Primary Examiner* — Alexander A Singh
(74) *Attorney, Agent, or Firm* — Kilpatrick Townsend & Stockton LLP (57) ABSTRACT

A rotating machine assembly includes a rotating machine that has a cover that defines an outer surface of the rotating machine and a stator disposed within the cover. The stator is stationary with respect to the cover. The rotating machine also includes a shaft rotatably disposed at least partially within the cover so as to define a rotation axis. The shaft Includes a first end that is connectable to an aircraft engine and a second end that is opposite the first end. The rotating machine also includes a rotor attached to the shaft, the rotor being movable with respect to the stator and a power module including at least one MOSFET that periodically reverses an
(Continued)

electrical current direction of the rotor. The power module includes the at least one MOSFET Is disposed within the cover.

20 Claims, 6 Drawing Sheets

(51) Int. Cl.
*H02K 9/10* (2006.01)
*H02K 9/22* (2006.01)
*H02K 7/00* (2006.01)

(58) Field of Classification Search
CPC .. H02K 9/06; H02K 9/08; H02K 9/10; H02K 9/12; H02K 9/14; H02K 9/16; H02K 9/18; H02K 9/22; H02K 9/227; H02K 7/14; H02K 5/04; H02K 7/1823; H02K 5/18; H02K 2211/03; F02C 7/275; F02C 7/32; F02C 7/268; F02N 11/0859; F02N 11/04; F02N 15/006; F02N 2250/00; F02N 2011/0896; H02M 7/003
USPC ....... 310/68 R, 89, 52, 54, 55, 57, 58, 60 R, 310/61, 62, 63, 60 A, 64
See application file for complete search history.

(56) References Cited

U.S. PATENT DOCUMENTS

| | | | |
|---|---|---|---|
| 2016/0104658 A1* | 4/2016 | Bradfield | ............... H02K 11/33 |
| | | | 257/713 |
| 2018/0030944 A1* | 2/2018 | Raad | ....................... H02P 9/302 |
| 2018/0350720 A1 | 12/2018 | Bradfield | |

FOREIGN PATENT DOCUMENTS

| | | |
|---|---|---|
| EP | 3276800 A1 | 1/2018 |
| JP | 6217357 B2 | 10/2017 |

* cited by examiner

POWER ELECTRONICS SECTION OF A STARTER-GENERATOR WITHOUT A COMMUTATOR

BACKGROUND

Starter-generator machines often have commutators on the rotors which interact with electrical brushes that are attached to the stationary frame of the machine. The commutators and brushes have an electrical switching function, for as the commutator rotates, different sections of the commutator make or break electrical contact with the brushes. This switching function which occurs in relationship to the rotation of the rotor is necessary for proper operation of the rotating starter-generator.

However, as the commutators rotate under the brushes, the brushes experience wear, and eventually the brushes have to be replaced. The brushes are typically the limiting wear item in the machine which determines the amount of time that a starter-generator can be on an aircraft before the starter-generator has to be removed for overhaul. It is desirable to create starter-generators which will allow for a longer time between overhauls, but this requires finding an alternative to the switching function of the commutators and brushes.

One way of accomplishing this is to use electrical components, such as MOSFETs, to perform this switching function. Sensors can measure the rotational speed and position of the rotor, and electronics can use those measurements to know when to send signals to the MOSFETs for them to switch on or off. Using electronics to drive MOSFETs can replace the rotation based switching function of the brushes and commutators.

However, using such MOSFETs in this manner brings its own set of problems. One problem is where to house them, for these electronics take up more space than traditional commutators and brushes. Another problem is how to cool the MOSFETs, for these electronics generate more heat than the traditional commutators and brushes.

To address these issues, a brushless starter-generator with a separate box that houses the electronics can be utilized. However, there are potential downsides to this solution. For example, additional space has to be provided on the aircraft for the separate box.

Additionally, high-current capacity wires have to be run between the separate box and the starter-generator. These high-current capacity wires are thick and heavy. This results in additional weight and complicated assembly techniques. Neither of these items is desirable for aircraft applications.

Accordingly, a more advanced starter-generator is needed.

SUMMARY

In view of the foregoing, a rotating machine assembly includes a rotating machine that has a cover that defines an outer surface of the rotating machine and a stator disposed within the cover. The stator is stationary with respect to the cover. The rotating machine also includes a shaft rotatably disposed at least partially within the cover so as to define a rotation axis.

The shaft includes a first end that is connectable to an aircraft engine and a second end that is opposite the first end. The rotating machine also includes a rotor attached to the shaft, the rotor being movable with respect to the stator and a power module including at least one MOSFET that periodically reverses an electrical current direction of the rotor. The power module includes the at least one MOSFET is disposed within the cover.

DETAILED DESCRIPTION

Figure 1:
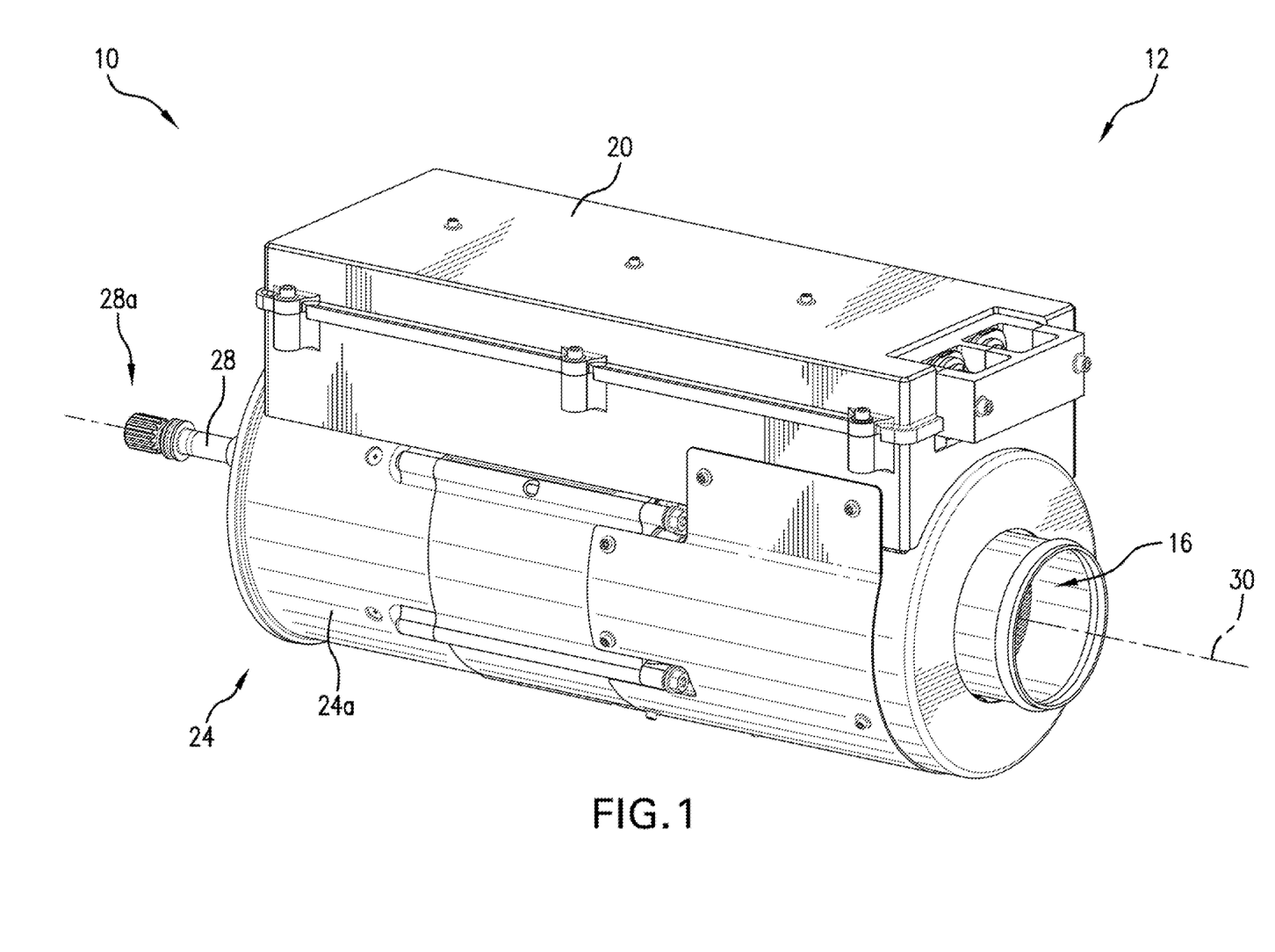
FIG. 1 is a perspective view of a rotating machine assembly.

With reference to FIG. 1, a rotating machine assembly 10 is shown. Without departing from the scope of the disclosure, the rotating machine assembly 10 could be an electric motor (e.g., a starter utilized on an aircraft to start the engine) or a generator that converts rotary motion to electrical energy. Alternatively, the rotating machine assembly 10 can be a combination starter-generator that is used to start the engine of an aircraft (i.e., startup mode) and also generate electricity for usage by the aircraft (i.e., generating mode).

Figure 2:
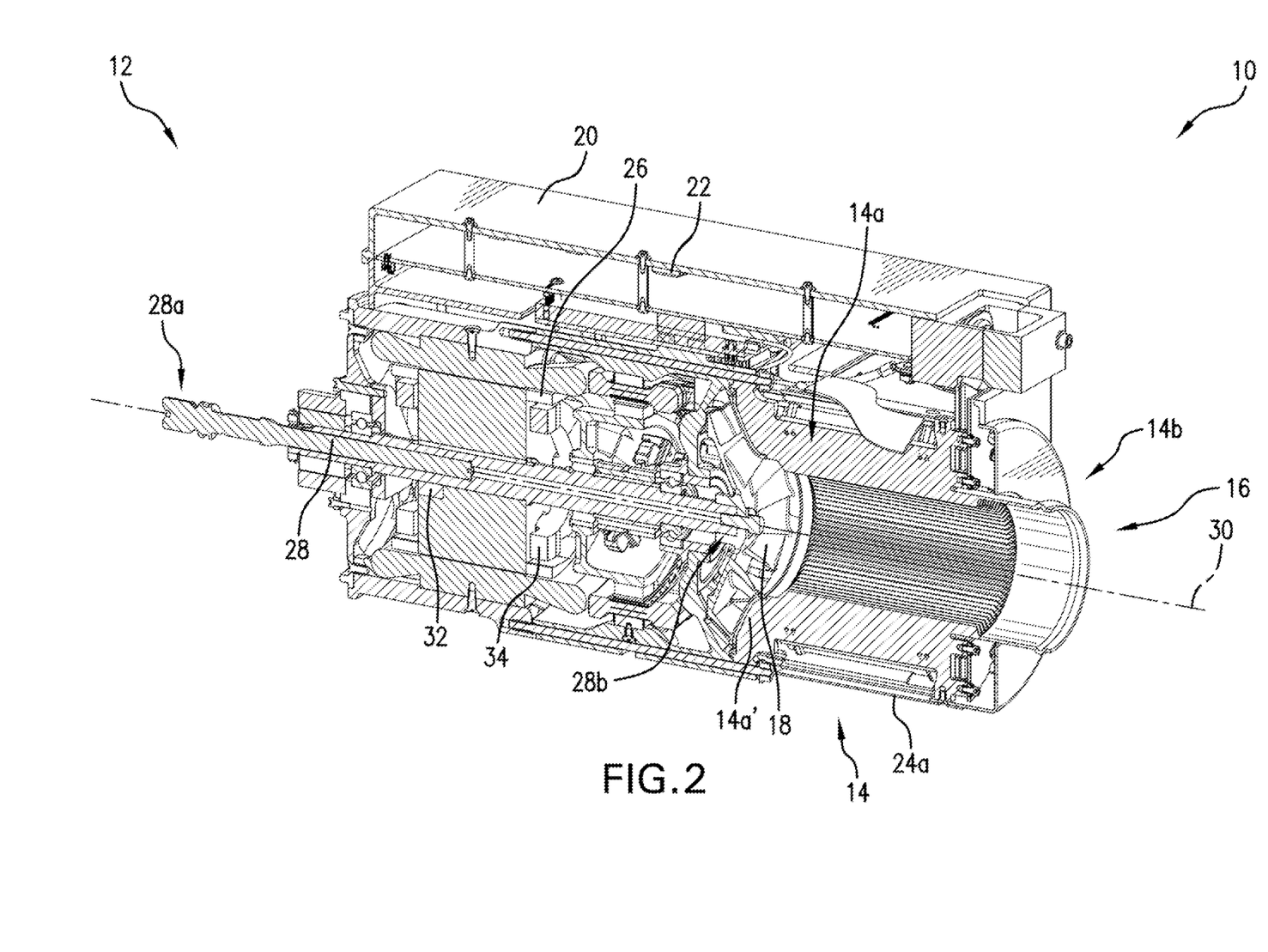
FIG. 2 is a partial sectional perspective view of the rotating machine assembly.
Figure 3:
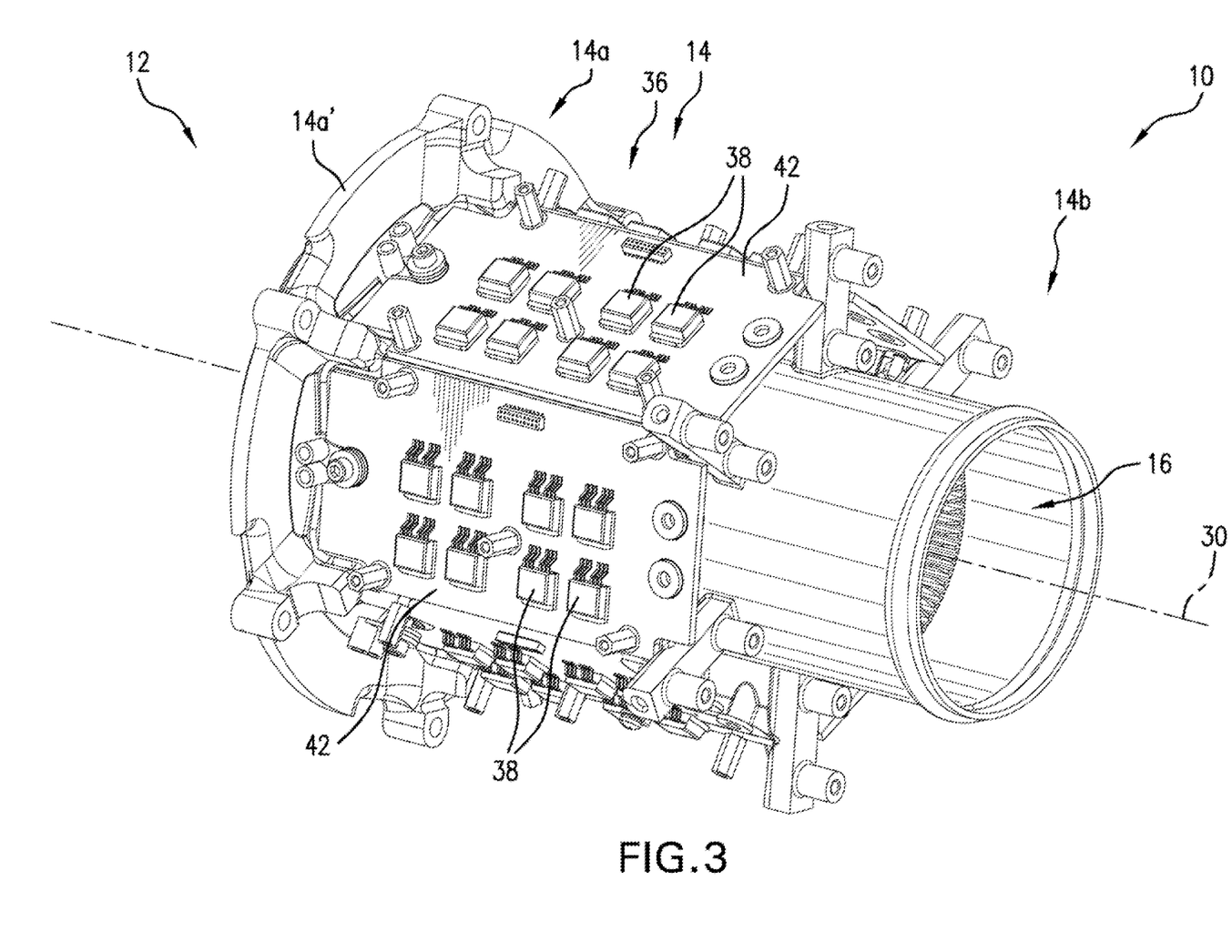
FIG. 3 is a perspective view of the rotating machine assembly with a cover removed.

As shown in FIGS. 1-3, the rotating machine assembly 10 includes a rotating machine 12, a chassis 14 that defines an air tunnel 16, a fan 18, and a control enclosure 20 with a control module 22. The rotating machine 12 includes a cover 24, a stator 26, and a shaft 28. The shaft 28 includes a first end 28*a* and a second end 28*b* and defines a rotation axis 30.

As shown in FIG. 2, the rotating machine assembly can also include a shaft sensor 32 that can sense or measure a rotational speed and position of the shaft 28, and hence a rotor 34. The shaft sensor 32 can be of known technology. Further, the shaft sensor 32 can be disposed in a variety of locations without departing from the scope of the disclosure. Additionally, the shaft sensor 32 can be connected to the control module 22 by wired or wireless means to allow communication between the shaft sensor 32 and the control module 22.

The rotating machine 12 also includes the rotor 34 that is connected to the shaft 28. The rotating machine 12 can also include a power module 36 with at least one MOSFET 38. As shown in FIG. 3, the at least one MOSFET 38 is disposed on a circuit board 42. The circuit board 42 may be a printed circuit board.

For convenience, this disclosure will refer to the printed circuit board(s) as merely a circuit board, but will be understood to include printed circuit boards. For clarity, the electrical wires to communicate electricity, whether for power purposes or for signal communication, between the power module 36, the MOSFETs 38, and the other various components has been omitted from the drawings.

With attention once again to FIGS. 1-2, the cover 24 defines an outer surface 24*a* of the rotating machine 12 and serves to contain the components together in an easily manipulatable package to aid in installation into the aircraft. The cover 24 may be made of any number of materials, including, for example, sheet stock. As illustrated, the cover 24 may be attached to the chassis 14 with fasteners, but other means of attachment are contemplated. The cover 24 can be non-structural in nature. Further, the cover 24 defines a cylindrical shape in cross-section in a plane orthogonal to the rotation axis 30.

For reference, this cylindrical shape of the present rotating machine 12 has an outer diameter that is equal to an outer diameter of a traditional rotating machine that uses brushes and commutators for rotation based switching. By having the same outer diameter as a traditional rotating machine, space is conserved and retrofitting of machine assemblies is simplified. Further, keeping the outer diameter of the present rotating machine 12 the same as a traditional starter-generator and not requiring a separate box with heavy wires connecting it to the rotating machine 12 will make it easier for installation of the present rotating machine assembly 10 into the aircraft.

The stator 26 is of known construction. The stator 26 is a stationary part of the rotating machine 12, and thus is stationary with respect to the cover 24. When the rotating machine assembly 10 is a generator, energy flows through the stator 26 to or from the rotor 34 as is known. When the rotating machine assembly 10 is a starter, the stator 26 provides a rotating magnetic field that drives the rotating armature, as is also known in the art. When the rotating machine assembly 10 is a generator, the stator 26 converts the rotating magnetic field to electric current. The stator 26 is disposed within the cover 24.

The rotating machine 12 also includes the shaft 28 that is rotatably disposed at least partially within the cover 24. As illustrated, the first end 28*a* of the shaft extends in a manner so as to not be contained within the cover 24. The shaft 28 can be circular in cross-section in a plane orthogonal to the rotation axis 30. The shaft 28 may be received within one or a plurality of bearings.

As shown in FIG. 2, the first end 28*a* of the shaft 28 can include a plurality of splines so as to rotatably connect the rotating machine assembly 10 to an aircraft engine. It will be appreciated that means of connecting the rotating machine assembly 10 to the aircraft engine other than the splines could be utilized without departing from the scope of the disclosure. The second end 28*b* of the shaft 28 is opposite the first end 28*a* of the shaft 28, along the rotation axis 30.

The rotating machine 12 also includes the rotor 34, which is attached or coupled to the shaft 28 so that the shaft 28 and the rotor 34 rotate together. The rotor 34 is of known construction. Rotation of the rotor 34 is due to the interaction between the windings and magnetic fields which produces a torque around the rotation axis 30. The rotor 34 is movable with respect to the stator 26.

As shown in FIG. 3, the power module 36 includes the at least one MOSFET 38. However, as illustrated, multiple MOSFETs 38 could be utilized without departing from the scope of the disclosure. The MOSFET 38 is a metal-oxide-semiconductor field-effect transistor. In particular, the MOSFET 38 is a type of field-effect transistor (FET) that is fabricated by the controlled oxidation of silicon. The MOSFET 38 has an insulated gate (not shown), whose voltage determines the conductivity of the device.

This ability to change conductivity with the amount of applied voltage can be used for amplifying or switching electronic signals. In terms of the present disclosure, the MOSFET 38 periodically reverses an electrical current direction of the rotor 34, thereby taking the place of appropriate power switching electronics. For example, the MOSFET 38 takes the place of the electrical switching function of the commutators and brushes that are found in traditional rotating machine 12 assemblies. As illustrated, the power module 36 including the at least one MOSFET 38 is disposed within the cover 24.

A traditional assembly includes brushes that make or break contact on electrical bars of the commutator. These electrical bars run parallel to the rotational axis, and as the shaft rotates, the brushes make or break electrical contact with these electrical bars of the commutator.

Thus, the electrical contact from the brushes to the commutator bars is a function of the shaft rotational position. This rotational switching function, which is a function of the shaft rotational position, is replaced by the MOSFETs 38 in the present disclosure. Thus, as the shaft 28 rotates, the control module 22, in view of a signal from the shaft sensor 32, tells the MOSFETs 38 to switch on or off depending on the rotational position of the shaft 28.

The plurality of MOSFETs 38 can disposed on a plurality of printed circuit boards 42 that are circumferentially mounted to the chassis 14 so as to be between the air tunnel 16 and the cover 24 to radially surround the air tunnel 16. As illustrated, there are six circuit boards 42 which each include a plurality of MOSFETs 38.

Mounting the MOSFETs 38 in this way keeps the wasted space to a minimum while providing efficient ways of dissipating the heat generated into either the phase changer material or into the air flow. Further, a plurality of pads 40 can be respectively disposed between the plurality of printed circuit boards 42 and the chassis 14. The pads 40 can have a generally rectangular shape and be of nominal thickness so as to be of sheet-like construction.

Further, the plurality of pads 40 are thermally conductive electrical insulators to electrically isolate the printed circuit boards 42 from the chassis 14. The pads 40 can be very thin so as to be similar in thickness to a sheet of paper. Thus, as shown in the drawings, the pads 40 can appear to be merely an outer surface of the chassis 14, but are in fact separate from the chassis 14.

The control module 22 is disposed within the control enclosure 20. It is noted that the control module 22 is separate from and distinct from the power module 36. Further, the control enclosure 20 is mounted on the cover 24 of the rotating machine 12 so as to be external to and attached to the rotating machine 12. As illustrated, the control enclosure 20 had a rectangular box shape construction that is mounted to the outer diameter of the rotating machine 12.

As will be understood, the power module 36 switches the power on and off with the MOSFETs 38. However, the power module 36 itself does not know when to switch that power on and off. In contrast, the control module 22 receives an input from the shaft sensor 32, so the control module 22 knows when the power should be switched on or off.

The control module 22 then sends a low power electrical signal to the power module 36, and that low power electrical signal tells the power module 36 when to switch on or off. Stated another way, the power module 36 functions similar to electrical relays, and the control module 22 is telling the relays when to activate.

With reference to FIGS. 1-3, the chassis 14 is received in the cover 24 and is at least partially disposed adjacent the second end 28*b* of the shaft 28. The chassis 14 can be made of any number of materials, including for example, aluminum. Aluminum offers good strength, light weight, and high thermal conductivity. The chassis 14 combines and performs several functions. For example, the chassis 14 serves as a heat sink.

Further, the chassis 14 can be a structural part to which all other parts of the power module 36 can be attached and can also provide an important part of the rotating machine assembly 10 interface with the aircraft. Notably, the chassis 14 can provide all attachment locations for every component in the power module 36, as well as connections to the rest of the rotating machine 12 and to an air inlet hose (not shown). As the chassis 14 is a single component that performs many functions, the size of the rotating machine assembly 10 is kept to a minimum.

Figure 4:
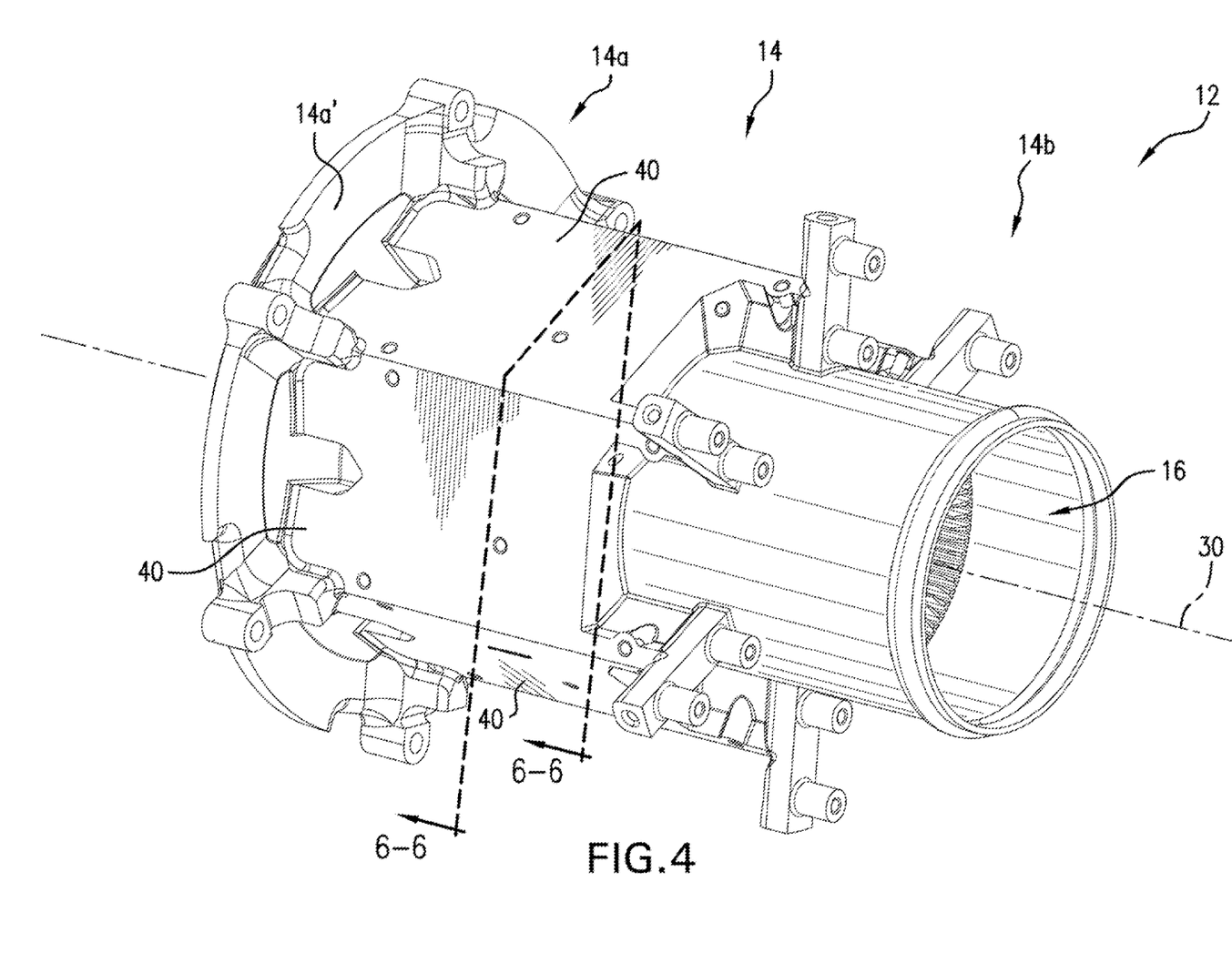
FIG. 4 is a perspective view of the rotating machine assembly with some components removed.

As shown in FIGS. 2 and 4, the chassis 14 can include a main body portion 14a and an inlet portion 14b disposed at opposite ends thereof. The inlet portion 14b and the first end 28a of the shaft 28 are disposed at opposite ends of the rotating machine assembly 10 such that the main body portion 14a is disposed therebetween. The main body portion 14a includes a shroud 14a' and defines a main body inner perimeter and a main body outer perimeter. The shroud 14a' can be used as a housing for the fan 18 and further direct the air that has traveled through the air tunnel 16.

Further, the inlet portion 14b defines an inlet inner perimeter and an inlet outer perimeter. The main body outer perimeter is greater than the inlet outer perimeter and the main body inner perimeter. Due to the illustrated shape of the main body portion 14a, the shroud 14a', and the inlet portion 14b, it will be appreciated that the term perimeter could be replaced with the term diameter without departing from the scope of the disclosure.

This shape allows for the air to be efficiently passed through the air tunnel 16 and properly cool the MOSFETs 38 as will be described in more detail hereinafter. For example, the air tunnel 16 is in fluid communication with the rotor 34 so as to transfer heat away from the power module 36 including the at least one MOSFET 38 that are attached to the chassis 14.

With attention to FIGS. 2-3, the fan 18 can be disposed at the second end 28b on the shaft 28. Additionally, the fan 18 is fluidicly disposed between the inlet portion 14b of the chassis 14 and the rotor 34 to aid in cooling of the MOSFETs 38 as will be described hereinafter. As the fan 18 is rotationally linked to the shaft 28, rotation of the shaft 28 results in rotation of the fan 18. The fan 18 can include at least one blade that is shaped in a manner so as so pull air thorough the air tunnel 16. The direction of the airflow due to the fan 18 can be from the inlet portion 14b toward the main body portion 14a.

Figure 5:
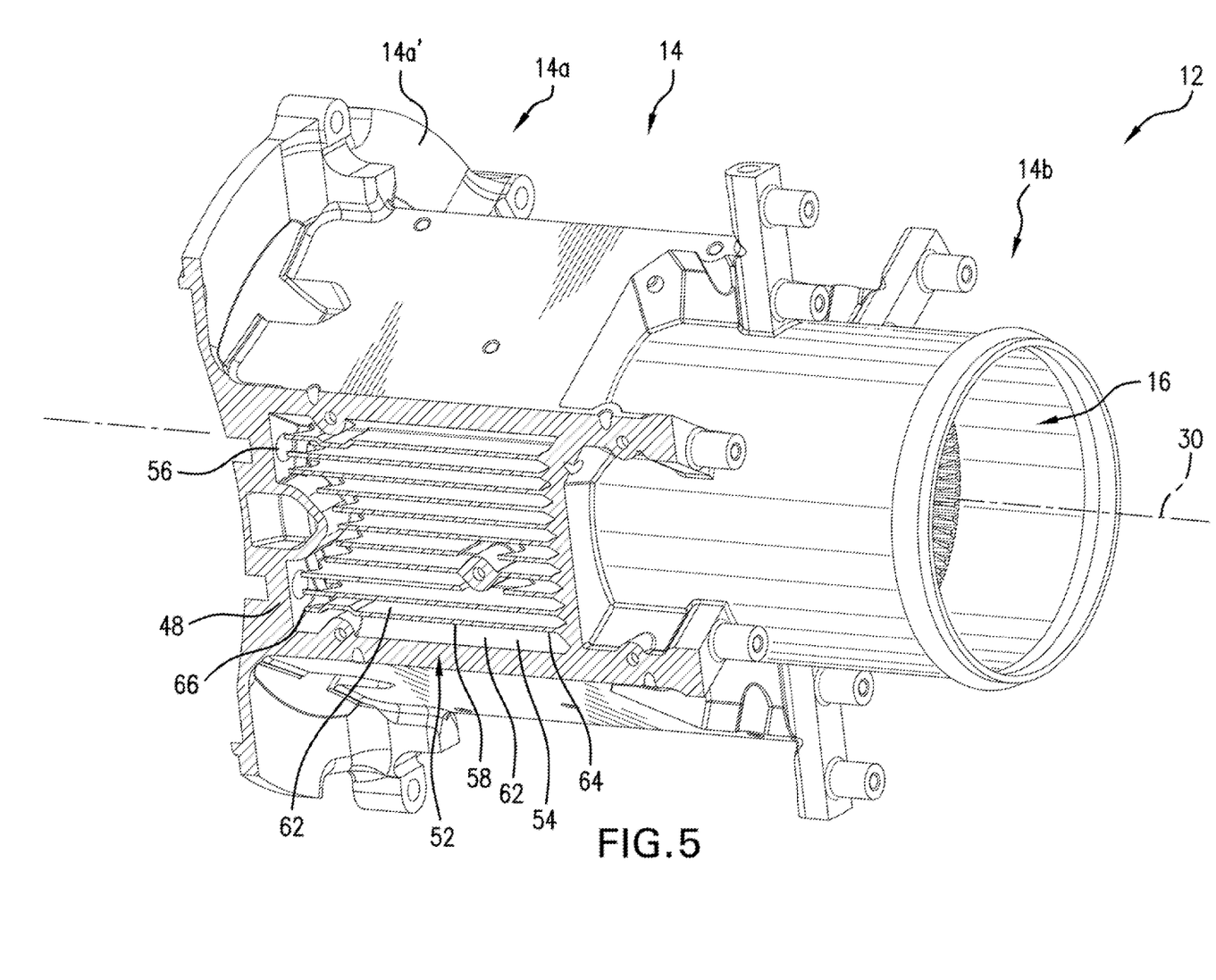
FIG. 5 is a partial sectional perspective view of FIG. 4.
Figure 6:
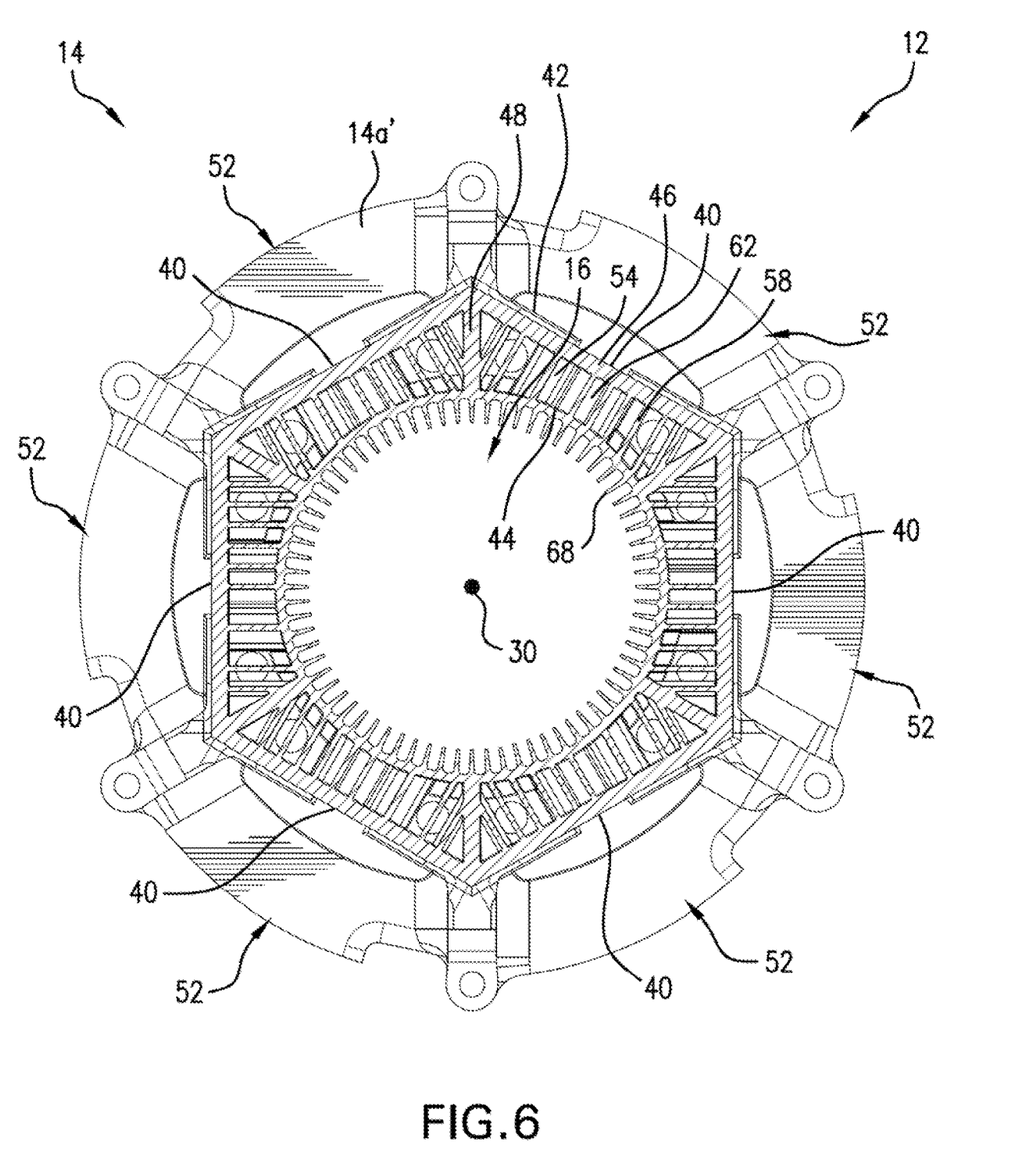
FIG. 6 is a sectional elevation view of FIG. 4 along lines 6-6.

With reference to FIGS. 5-6, the rotating machine 12 is shown. The chassis 14 includes an inner wall 44 that defines the air tunnel 16. The inner wall 44 further defines a circular cross-section in a plane orthogonal to the rotation axis 30. The chassis 14 also includes an outer wall 46 that is radially exterior to the inner wall 44.

The outer wall 46 defines a hexagonal cross-section in a plane orthogonal to the rotation axis 30. The chassis 14 also includes at least one sidewall 48 that extends between the inner wall 44 and the outer wall 46 to define a sidewall height and to connect the inner wall 44 and the outer wall 46 together.

The chassis 14, and more particularly, the sidewall 48 defines at least one cavity 52. Even more particularly, the inner wall 44, the outer wall 46, and the sidewall 48 can cooperate to define the cavity 52. The cavity 52 is radially disposed between the air tunnel 16 and the cover 24. The inner wall 44, the outer wall 46, and the at least one sidewall 48 are integral so as to prevent fluid communication between the air tunnel 16 and the at least one cavity 52.

It is noted that the chassis 14 can be created by additive manufacturing, also known as 3D printing, so that the inner wall 44, the outer wall 46, and the sidewall 48, and as will be discussed in more detail hereinafter, the ribs 58 and fins 68, are integrally formed together. This allows for the better heat transfer and reduces the risk associated with a removable inner wall, outer wall, and/or sidewall.

The power module 36 including the at least one MOSFET 38 is radially disposed between the at least one cavity 52 and the cover 24. For convenience, the cavity 52 will be described as a single object. However, there can be six or more cavities 52 radially disposed about the air tunnel 16 to sufficiently thermally manage the six or more circuit boards 42 and plurality of MOSFETs 38 disposed on each circuit board 42. These cavities may be identical in structure to the cavity 52 described herein. As illustrated, these cavities are fluidically isolated from one another.

A phase change material 54 can be disposed in the cavity 52. In fact, the phase change material 54 can fill all voids in the cavity 52. The cavity 52 can include at least one sealable port 56 through which the phase change material 54 is introduced into the cavity 52 with the port 56 being subsequently sealed to prevent leakage of the phase change material 54 from the cavity 52. The phase change material 54 can be a waxy solid that melts at 108 degrees Celsius and has a heat storage capacity of 180 joules per gram so that a heat of fusion associated with the melting of the phase change material 54 absorbs heat from the at least one MOSFET 38.

At 108 degrees Celsius, the phase change material 54 will melt, and the heat of fusion associated with this melting transition will absorb much of the extra heat produced by the MOSFETs 38 while holding the phase change material 54 temperature at 108° C. until the melting is complete.

Using phase change material 54 allows for longer or more rigorous startup mode cycles with less mass than would otherwise be needed with a solid aluminum heat sink. It will be appreciated that different phase change materials could be used in place of the described phase change material 54 without departing from the scope of this disclosure.

With continued attention to FIGS. 5-6, the cavity 52 can include a plurality of ribs 58 that extend between the inner wall 44 and the outer wall 46 to connect the inner wall 44 and the outer wall 46 together to define a rib height. Further, the cavity 52 can include a plurality of fins 68 that extend from the inner wall 44 toward the rotation axis 30 so as to define a fin height.

This extension of the fins 68 toward the rotation axis 30 can be in a radial manner so that air can pass in between the individual fins 68 as the air travels through the air tunnel 16 toward the fan 18. Further, the rib height can be greater than the fin height and less than the sidewall height. Further still, the plurality of fins 68 are in fluid communication with the air tunnel 16, whereas the ribs 58 are not.

The ribs 58 can define a plurality of channels 62 that are in fluid communication with one another and directly contact the phase change material 54 that is disposed within the cavity 52. Each of the plurality of ribs 58 can include an attached end 64 that extends from the at least one sidewall 48 toward the stator 26 and a free end 66 that is opposite the attached end 64. A space between the free end 66 of each of the plurality of ribs 58 and the at least one sidewall 48 allows for fluid communication between the plurality of channels 62.

A purpose of the phase change material 54 in the chamber is for the starting mode of the rotating machine 12, so that the MOSFETs 38 do not overheat. During generating mode of the rotating machine 12, the motor is spinning at a normal RPM, so the rotating fan 18 is pulling air through the rotating machine 12. That airflow allows the heat that is produced by the MOSFETs 38 during the generating mode to be dissipated into the moving air through the fins 68 that are in the airflow. However, this does not work for the starting mode for two reasons.

One reason is that because the rotating machine 12 is spinning slowly during the startup mode, the fan 18 is also slowly rotating, which means that there is little to no airflow going over these fins 68 to dissipate the heat generated by the MOSFETs 38. Another reason is that the MOSFETs 38 are producing more heat during the starting mode than during the generating mode. During starting mode, as the MOSFETs 38 are producing more heat and as the rotating machine 12 cannot dissipate this heat as there is little to no airflow, the MOSFETs 38 have been shown to overheat for certain startup mode sequences if the described rotating machine assembly 10 is not utilized.

The rib 58 can have multiple functions. For example, one function of the ribs 58 is for the starting mode and one is for the generating mode. During starting mode, the ribs 58 provide a path for the heat to quickly get to the center of the phase change material 54, because the phase change material 54 has a low thermal conductivity. Because of this low thermal conductivity, if the ribs 58 were not there, the outside of the phase change material 54 would melt and increase its temperature above 108 degrees Celsius while the center of the phase change material 54 would still remain solid.

This would not efficiently keep the MOSFETs 38 cool during the various startup mode sequences. As shown, the ribs 58 connect the inner wall 44 and the outer wall 46. Thus, the ribs 58 can transmit the heat from the MOSFETs 38 into the center of the cavity 52, and hence, the center of phase change material 54 during startup mode. If the ribs 58 were not connected to the outer wall 46, then the heat may not be effectively transmitted to the cavity 52, and hence, the center of the phase change material 54.

During generating mode, as there is airflow, the ribs 58 conduct the heat from the MOSFETs 38 to the internal wall of the chassis 14 and then the heat is dissipated into the airflow. As the phase change material 54 has a low thermal conductivity, the heat practically bypasses the phase change material 54 as it flows almost entirely through the fins 68 in the air tunnel 16.

This is why the ribs 58 are connected to both the outer wall 46 and the inner wall 44 of the cavity 52. Notably, both of these connections ensure that the heat is transferred from the MOSFETs 38 through the ribs 58 to the fins 68 that are in the air tunnel 16. If the ribs 58 were not connected to both the outer wall 46 and the inner wall 44 of the chamber, then the heat would not be transmitted from the MOSFETs 38 to the fins 68 in the air tunnel 16.

As described hereinbefore, numerous advantages are provided by the chassis 14. For example, the chassis 14 provides a mounting connection for the air inlet hose (not shown) from the aircraft, the air tunnel 16 to guide the air from the air hose inlet to the fan 18, fins 68 in the air tunnel 16 to further aid in heat transfer, and because it is arranged tightly against the fan 18, it can serve as the shroud 14a'. Notably, the fins 68 that are in the air tunnel 16 provide a way to dissipate the heat generated by the MOSFETs 38 during the generating mode of the rotating machine assembly 10, but not during the starting mode.

The integrated shroud 14a' allows for more efficient airflow with an optimized fan 18 which again improves the cooling of the rotating machine 12. Having all these functions integrated into one part (i.e., the chassis 14) reduces complexity and part count and eliminates interface problems which could occur with multiple parts that perform the same functions. Having this as one part also makes it easier to optimize the airflow as there are no fasteners or part interfaces which might disrupt the airflow. As will be appreciated, this is extremely desirable in an aircraft.

A rotating machine assembly has been described above with particularity. Modifications and alterations will occur to those upon reading and understanding the preceding detailed description. The invention, however, is not limited to only the embodiments described above. Instead, the invention is broadly defined by the appended claims and the equivalents thereof.

The invention claimed is:

1. A rotating machine assembly, comprising;
a rotating machine including
   a cover that defines an outer surface of the rotating machine;
   a stator disposed within the cover, the stator being stationary with respect to the cover;
   a shaft rotatably disposed at least partially within the cover so as to define a rotation axis, the shaft including a first end that is connectable to an aircraft engine and a second end that is opposite the first end;
   a rotor attached to the shaft, the rotor being movable with respect to the stator;
   a power module including at least one MOSFET that periodically reverses an electrical current direction of the rotor, wherein the power module including the at least one MOSFET is disposed within the cover; and
   a chassis at least partially disposed adjacent the second end of the shaft, wherein the power module including the at least one MOSFET is attached to the chassis and the chassis defines an air tunnel in fluid communication with the rotor so as to transfer heat away from the at least one MOSFET, wherein the chassis defines at least one cavity radially disposed between the air tunnel and the cover, and wherein the at least one cavity includes a phase change material disposed therein.

2. The rotating machine assembly of claim 1, further including a control enclosure with a control module disposed within, wherein the control module is separate from and distinct from the power module and the control enclosure is mounted on the cover of the rotating machine so as to be external to and attached to the rotating machine.

3. The rotating machine assembly of claim 1, wherein the chassis includes a main body portion and an inlet portion disposed at opposite ends thereof, the inlet portion and the first end of the shaft being disposed at opposite ends of the rotating machine assembly such that main body portion is disposed therebetween, and wherein the chassis is received in the cover.

4. The rotating machine assembly of claim 3, wherein the main body portion defines a main body inner perimeter and a main body outer perimeter and the inlet portion defines an inlet inner perimeter and an inlet outer perimeter, and wherein the main body outer perimeter is greater than the inlet outer perimeter and the main body inner perimeter.

5. The rotating machine assembly of claim 3, further comprising a fan disposed at the second end on the shaft, wherein the fan is fluidicly disposed between the inlet portion of the chassis and the rotor.

6. The rotating machine assembly of claim 1, wherein the phase change material is a waxy solid that melts at 108 degrees Celsius and a heat storage capacity of 180 joules per gram so that a heat of fusion associated with the melting of the phase change material absorbs heat from the at least one MOSFET.

7. The rotating machine assembly of claim 1, wherein the power module including the at least one MOSFET is radially disposed between the at least one cavity and the cover.

8. The rotating machine assembly of claim 1, wherein the at least one cavity is defined by at least one sidewall and the at least one cavity includes a plurality of ribs that directly contact the phase change material, the plurality of ribs defining a plurality of channels that are in fluid communication with one another.

9. The rotating machine assembly of claim 8, wherein each of the plurality of ribs include an attached end that extends from the at least one sidewall toward the stator and a free end that is opposite the attached end, wherein a space between the free end of each of the plurality of ribs and the at least one sidewall allows for fluid communication between the plurality of channels.

10. The rotating machine assembly of claim 1, wherein the chassis includes an inner wall that defines the air tunnel, an outer wall that is radially exterior to the inner wall, and at least one sidewall that extends between the inner wall and the outer wall to define a sidewall height and to connect the inner wall and the outer wall together, and wherein the inner wall, the outer wall, and the at least one sidewall cooperate to define at least one cavity that includes a phase change material disposed therein.

11. The rotating machine assembly of claim 10, wherein the inner wall, the outer wall, and the at least one sidewall are integral so as to prevent fluid communication between the air tunnel and the at least one cavity, and wherein the at least one cavity includes at least one sealable port through which the phase change material is introduced into the at least one cavity.

12. The rotating machine assembly of claim 10, further including a plurality of ribs that extend between the inner wall and the outer wall to connect the inner wall and the outer wall together so as to define a plurality of channels that are in fluid communication with one another and directly contact the phase change material, and wherein an end of the plurality of ribs is spaced from the at least one sidewall to allow for the fluid communication between the plurality of channels.

13. The rotating machine assembly of claim 10, wherein the inner wall defines a circular cross-section in a plane orthogonal to the rotation axis.

14. The rotating machine assembly of claim 10, wherein the outer wall defines a hexagonal cross-section in a plane orthogonal to the rotation axis.

15. The rotating machine assembly of claim 10, wherein the chassis includes a plurality of fins that extend from the inner wall toward the rotation axis so as to define a fin height, and wherein the plurality of fins are in fluid communication with the air tunnel.

16. The rotating machine assembly of claim 15, wherein the at least one cavity includes a plurality of ribs that extend between the inner wall and the outer wall to connect the inner wall and the outer wall together to define a rib height, and wherein the rib height is greater than the fin height and less than the sidewall height.

17. The rotating machine assembly of claim 1, wherein the at least one MOSFET includes a plurality of MOSFETs, the plurality of MOSFETs being disposed on a plurality of printed circuit boards that are circumferentially mounted to the chassis so as to be between the air tunnel and the cover to radially surround the air tunnel.

18. The rotating machine assembly of claim 17, further comprising a plurality of pads disposed between the printed circuit boards and the chassis, wherein the plurality of pads are thermally conductive electrical insulators to electrically isolate the printed circuit boards from the chassis.

19. A rotating machine assembly, comprising;
 a rotating machine including
  a cover that defines an outer surface of the rotating machine;
  a stator disposed within the cover, the stator being stationary with respect to the cover;
  a shaft rotatably disposed at least partially within the cover so as to define a rotation axis, the shaft including a first end that is connectable to an aircraft engine and a second end that is opposite the first end;
  a rotor attached to the shaft, the rotor being movable with respect to the stator;
  a power module including at least one MOSFET that periodically reverses an electrical current direction of the rotor, wherein the power module including the at least one MOSFET is disposed within the cover; and
  a control enclosure with a control module disposed within, wherein the control module is separate from and distinct from the power module and the control enclosure is mounted on the cover of the rotating machine so as to be external to and attached to the rotating machine.

20. A rotating machine assembly, comprising;
 a rotating machine including
  a cover that defines an outer surface of the rotating machine;
  a stator disposed within the cover, the stator being stationary with respect to the cover;
  a shaft rotatably disposed at least partially within the cover so as to define a rotation axis, the shaft including a first end that is connectable to an aircraft engine and a second end that is opposite the first end;
  a rotor attached to the shaft, the rotor being movable with respect to the stator;
  a power module including at least one MOSFET that periodically reverses an electrical current direction of the rotor, wherein the power module including the at least one MOSFET is disposed within the cover; and
  a chassis at least partially disposed adjacent the second end of the shaft, wherein the power module including the at least one MOSFET is attached to the chassis and the chassis defines an air tunnel in fluid communication with the rotor so as to transfer heat away from the at least one MOSFET,
  wherein the chassis includes a main body portion and an inlet portion disposed at opposite ends thereof, the inlet portion and the first end of the shaft being disposed at opposite ends of the rotating machine assembly such that main body portion is disposed therebetween, and wherein the chassis is received in the cover,
  wherein the main body portion defines a main body inner perimeter and a main body outer perimeter and the inlet portion defines an inlet inner perimeter and an inlet outer perimeter, and wherein the main body outer perimeter is greater than the inlet outer perimeter and the main body inner perimeter.

* * * * *